(12) United States Patent
Tanaka et al.

(10) Patent No.: US 12,106,756 B2
(45) Date of Patent: Oct. 1, 2024

(54) INTERACTION DEVICE

(71) Applicant: NTT DOCOMO, INC., Chiyoda-ku (JP)

(72) Inventors: Go Tanaka, Chiyoda-ku (JP); Yutaro Shiramizu, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 376 days.

(21) Appl. No.: 17/626,030

(22) PCT Filed: Feb. 25, 2020

(86) PCT No.: PCT/JP2020/007500
§ 371 (c)(1),
(2) Date: Jan. 10, 2022

(87) PCT Pub. No.: WO2021/009962
PCT Pub. Date: Jan. 21, 2021

(65) Prior Publication Data
US 2022/0254346 A1 Aug. 11, 2022

(30) Foreign Application Priority Data
Jul. 12, 2019 (JP) ................................. 2019-130279

(51) Int. Cl.
G10L 15/22 (2006.01)
A63F 13/215 (2014.01)
(Continued)

(52) U.S. Cl.
CPC ............ *G10L 15/22* (2013.01); *A63F 13/215* (2014.09); *A63F 13/44* (2014.09); *A63F 13/80* (2014.09);
(Continued)

(58) Field of Classification Search
CPC ......... G10L 15/22; G10L 15/09; A63F 13/215
(Continued)

(56) References Cited

U.S. PATENT DOCUMENTS

| 2009/0286528 A1* | 11/2009 | Lie ..................... H04W 68/00 455/422.1 |
| 2014/0141760 A1* | 5/2014 | Ganesh ................. H04W 8/205 455/418 |
| 2019/0036861 A1* | 1/2019 | Shingu .................... H04L 51/18 |

FOREIGN PATENT DOCUMENTS

| JP | 2004301980 A * 10/2004 |
| JP | 2006-251545 A    9/2006 |

OTHER PUBLICATIONS

International Search Report mailed on May 26, 2020 in PCT/JP2020/007500 filed on Feb. 25, 2020, 2 pages.
(Continued)

*Primary Examiner* — Bharatkumar S Shah
(74) *Attorney, Agent, or Firm* — Oblon, McClelland, Maier & Neustadt, L.L.P.

(57) ABSTRACT

An interaction apparatus 10 includes an acquiring unit 13 for acquiring a system message, a setting unit 14 for setting a wait time for receiving an answer from a user based on the system message, a measuring unit 16 for measuring an elapsed time after the system message is output to the user, a user utterance acquiring unit 15 for acquiring a user utterance, and a controller 17 for controlling an interaction with the user so that an additional action corresponding to the system message is output to the user. The measuring unit 16 determines whether or not to subtract the elapsed time, based on the system message and the user utterance, when the user utterance not corresponding to the answer to the system message is acquired by the user utterance acquiring unit 15 after the system message is output.

11 Claims, 8 Drawing Sheets

(51) Int. Cl.
    *A63F 13/44*         (2014.01)
    *A63F 13/80*         (2014.01)
    *G06N 20/00*        (2019.01)
    *G10L 15/08*         (2006.01)

(52) U.S. Cl.
    CPC .............. *G06N 20/00* (2019.01); *G10L 15/08* (2013.01); *A63F 2300/1081* (2013.01); *A63F 2300/638* (2013.01); *A63F 2300/8094* (2013.01); *G10L 2015/227* (2013.01)

(58) Field of Classification Search
    USPC ........................................................ 704/232
    See application file for complete search history.

(56) References Cited

OTHER PUBLICATIONS

English translation of International Preliminary Report on Patentability and Written Opinion issued Jan. 27, 2022 in PCT/JP2020/007500, 5 pages.

\* cited by examiner

INTERACTION DEVICE

TECHNICAL FIELD

One aspect of the present invention relates to an interaction apparatus.

BACKGROUND ART

As a speech interaction system that interacts with a user, there is known a speech interaction system that varies a wait time until the system receives an answer from the user in accordance with a content of a question from the system to the user (for example, see Patent Document 1). The speech interaction system executes a predetermined error process when an elapsed time since the system becomes a state capable of accepting the user's voice response exceeds the wait time.

CITATION LIST

Patent Document

[Patent Document 1] Japanese Unexamined Patent Application Publication No. 2006-251545

SUMMARY OF INVENTION

Technical Problem

In the speech interaction system as described above, there is a case in which the user utters a filler such as "Uh.", which is a word for avoiding silence, in response to a question from the system. In this case, in a scene in which the user and the system perform daily interaction, it is considered appropriate to determine that the user has an intention to answer the question from the system and subtract (for example, reset) the elapsed time. On the other hand, for example, in a scene in which a game (for example, Yamanotesen game in which a plurality of players (in this case, user and system) present a word along with a specific theme alternately, or the like) in which it is necessary to set a time limit for the user's answer between the user and the system is performed, it is considered appropriate to continue the measurement without subtracting the elapsed time even if the user utters a filler. Since the speech interaction system described in Patent Document 1 does not take the above-described viewpoint into consideration at all, there is room for improvement in realizing more natural interaction between the user and the system.

Accordingly, an aspect of the present invention is to provide an interaction apparatus capable of realizing more natural interaction between a user and a system.

Solution to Problem

An interaction apparatus according to an aspect of the present invention includes an acquiring unit that acquires a system message for a user, a setting unit that sets a wait time for receiving an answer from the user based on the system message, a measuring unit that measures an elapsed time after the system message is output to the user, a user utterance acquiring unit that acquires a user utterance issued by the user, and a controlling unit that controls an interaction with the user so that an additional utterance action corresponding to the system message is output to the user when the elapsed time measured by the measuring unit exceeds the wait time. The measuring unit determines whether or not to subtract the elapsed time, based on the system message and the user utterance, when the user utterance not corresponding to the answer to the system message is acquired by the user utterance acquiring unit after the system message is output.

In the interaction apparatus according to an aspect of the present invention, a wait time is set based on a system message. When the elapsed time after the system message is output to the user exceeds the wait time, the interaction with the user is controlled so that the additional action is output to the user. According to this configuration, when the user is lost for words, communication can be promoted by further speaking from the system side. In the interaction apparatus, when a user utterance that does not correspond to an answer to the system message is acquired, it is determined whether or not to subtract the elapsed time based on the system message and the user utterance. With such a process, it is possible to appropriately switch whether or not the elapsed time is to be subtracted in accordance with a state of the dialogue between the system and the user. As a result, more natural interaction between the user and the system can be realized.

Advantageous Effects of Invention

According to an aspect of the present invention, it is possible to provide an interaction apparatus capable of realizing more natural interaction between a user and a system.

DESCRIPTION OF EMBODIMENTS

Figure 1:
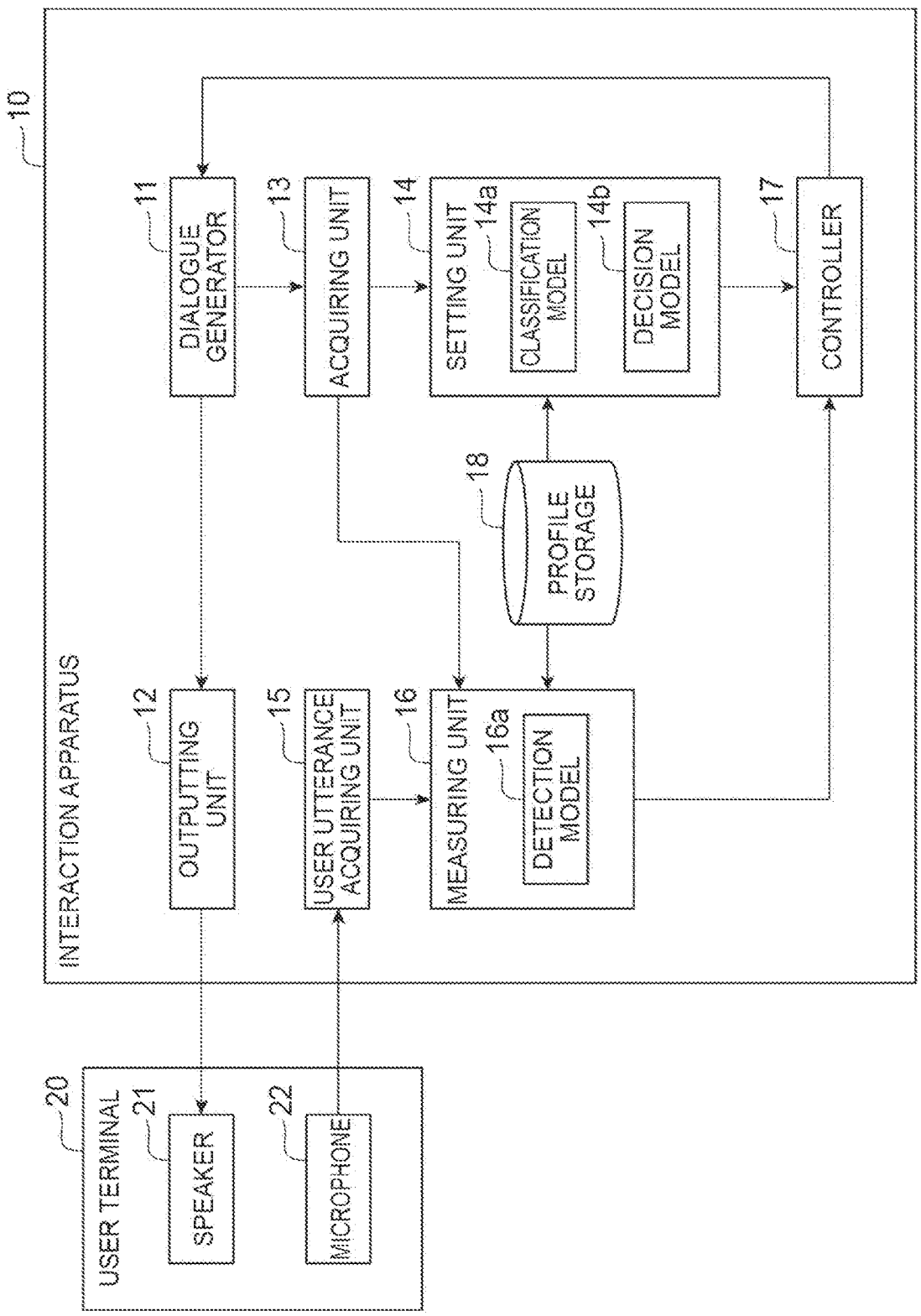
FIG. 1 is a diagram illustrating a functional configuration of an interaction apparatus according to the first embodiment.

Hereinafter, an embodiment of the present invention will be described in detail with reference to the accompanying drawings. In the description of the drawings, the same or corresponding element are denoted by the same reference numerals, and redundant description is omitted.

First Embodiment

FIG. 1 is a diagram illustrating a functional configuration of an interaction apparatus 10 according to the first embodiment. The interaction apparatus 10 is an apparatus that interacts with a user via the user terminal 20. For example, the user uses the user terminal 20 to interact with the interaction apparatus 10 by accessing the interaction apparatus 10 via a communication network such as the Internet. The user terminal 20 is a device owned by a user, such as a smartphone or a mobile terminal. The user terminal 20 includes a speaker 21 for outputting a system message received from the interaction apparatus 10 and a microphone 22 for inputting a user utterance. In the present embodiment, as an example, the system message is voice information that is output as voice by the speaker 21. However, the system message is not limited to the above, and may be display information such as text output to a display or the like included in the user terminal 20.

First, the interaction between the system (interaction apparatus 10) and the user (user terminal 20) will be described with reference to FIGS. 2 to 4. As will be described below, the interaction apparatus 10 can perform a daily interaction in which the system appropriately answers a question from the user, and can perform a game in which the user and the system alternately answer words along a predetermined theme.

Figure 2:
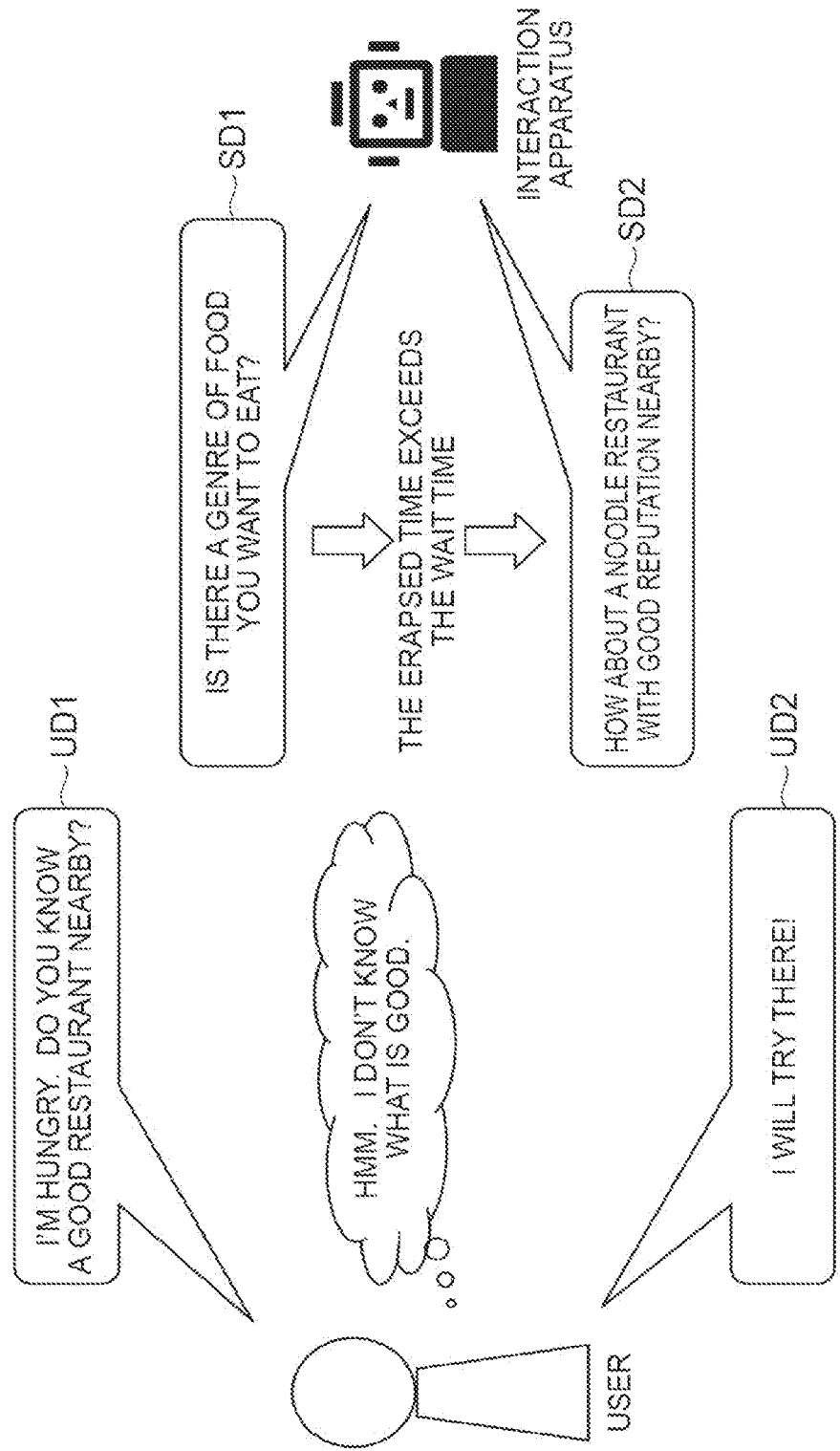
FIG. 2 is a diagram showing an example of interaction between a user and a system.
Figure 3:
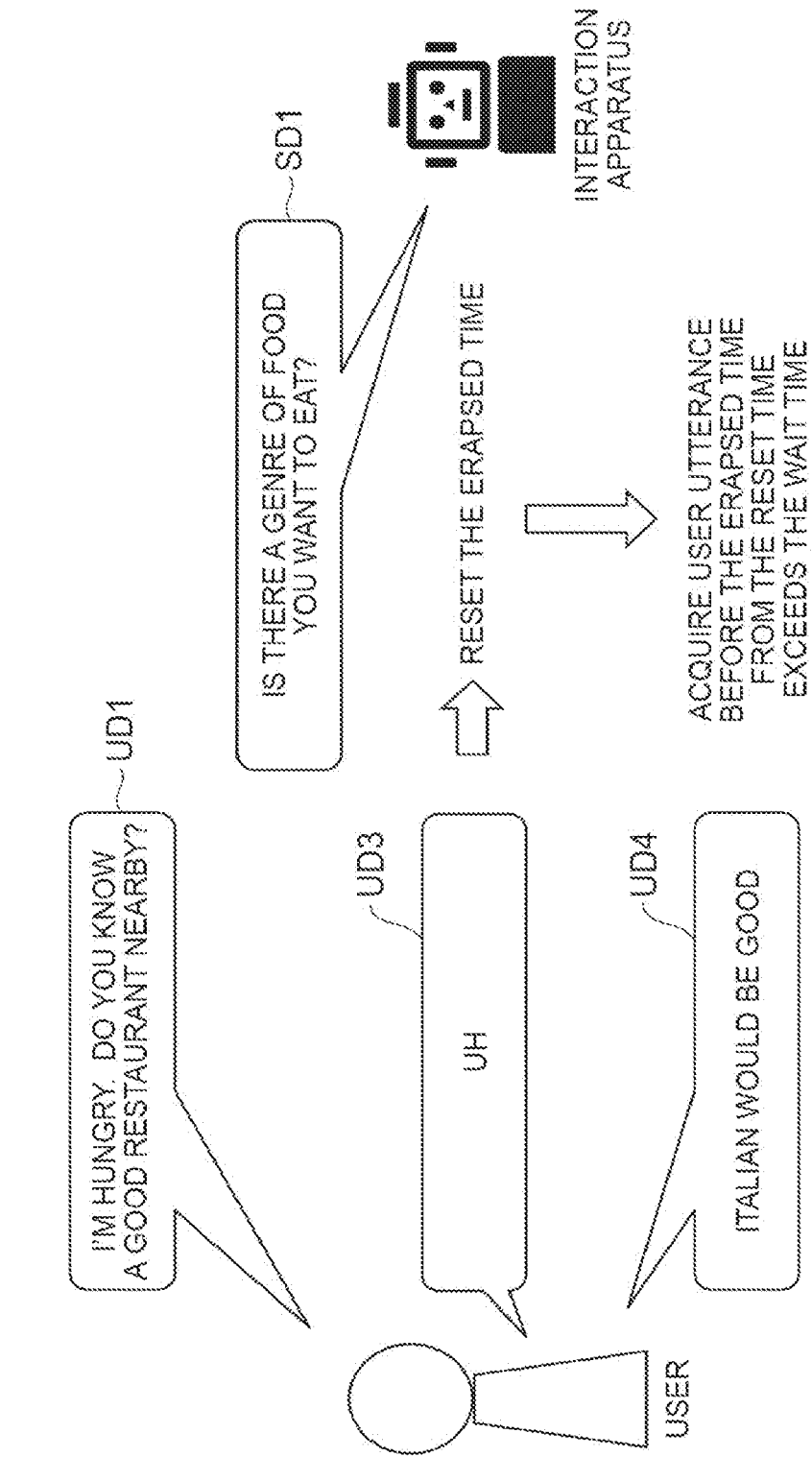
FIG. 3 is a diagram showing an example of interaction between the user and the system.

FIG. 2 shows an example of a user interaction with the system in the context of a daily interaction. In this example, first, the user inputs a user utterance UD1 "I'm hungry. Do you know a good restaurant nearby?" to the microphone 22 of the user terminal 20. The user utterance UD1 as a voice signal is transmitted to the interaction apparatus 10. As an example, when the interaction apparatus 10 receives the user utterance UD1, the interaction apparatus 1 performs speech recognition on the user utterance UD1 and analyzes the intention of the user utterance UD1. Then, the interaction apparatus 10 generates a system message SD1 as an answer to the user utterance UD1 in accordance with a result of the analysis. Here, as an example, the interaction apparatus 10 generates a system message SD1 of "Is there a genre of food you want to eat?" and transmits the system message SD1 to the user terminal 20.

When the user terminal 20 receives the system message SD1, the user terminal 10 outputs the system message SD1 from the speaker 21. Subsequently, the user considers an answer to the system message SD1. At this time, the user may feel pressure that he/she must answer accurate contents from the consciousness that the conversation partner is the system. In addition, since the user does not easily conceive of the content of the answer, the time during which both the user and the system are silent may be prolonged.

Therefore, the interaction apparatus 10 sets a wait time that can accept an answer from the user. The interaction apparatus 10 measures elapsed time after the system message SD1 is output to the user (that is, after the interaction apparatus 10 is in a state of waiting for a response from the user). Upon detecting that the elapsed time exceeds the wait time, the interaction apparatus 10 generates and outputs an additional system message SD2 (additional action). Here, as an example, the interaction apparatus 10 generates a system message SD2 of "How about a noodle restaurant with good reputation nearby?" and transmits the system message SD2 to the user terminal 20. In this example, the user receives the additional system message SD2 and inputs the user utterance UD2 of "I will try there!". Thereafter, for example, the interaction apparatus 10 analyzes the intention of the user utterance UD2 (here, the agreement to the proposal of the system message SD2), generates answer information (for example, information on the location of the noodle shop proposed by the system message SD2) in accordance with the analysis result, and transmits the answer information to the user terminal 20.

As illustrated in FIG. 2, after outputting the system message SD1, the interaction apparatus 10 does not wait for a long time until receiving an answer from the user, but outputs the additional system message SD2 for prompting the user to answer when the elapsed time exceeds the wait time set in the system message SD1. With this configuration, it is possible to provide communication that makes the user feel a sense of humanness. As a result, it is possible to relax the user's stress on the interaction with the system, and to achieve smooth communication between the user and the system.

Next, with reference to FIG. 3 and FIG. 4, a description will be given of an example of a dialogue in a case where the user makes a statement that does not correspond to an answer to the system message. The example of FIG. 3 shows a case where, in the case of FIG. 2, after the system message SD1 is output, before the elapsed time exceeds the wait time, the user utterance UD3 of "Uh" is input. The user utterance UD3 is a so-called filler. The filler is a speech that fills a gap (avoid silence) in a conversation, such as "Uh", "Well", or "Errr". In other words, the filler is a word for filling a pause in a conversation. The question of the system message SD2 does not require an absolute time limit until the user answers. In addition, the fact that the user utterance UD3 has been issued is considered to indicate that the user intends to answer. Therefore, in this case, the interaction apparatus 10 subtracts (here, resets) the elapsed time in response to receiving the user utterance UD3 which is the filler. By such processing, it is possible to appropriately extend the time during which the user can respond. As a result, in this case, the interaction apparatus 10 can appropriately acquire the user utterance UD4 before the elapsed time from the reset time exceeds the wait time.

Figure 4:
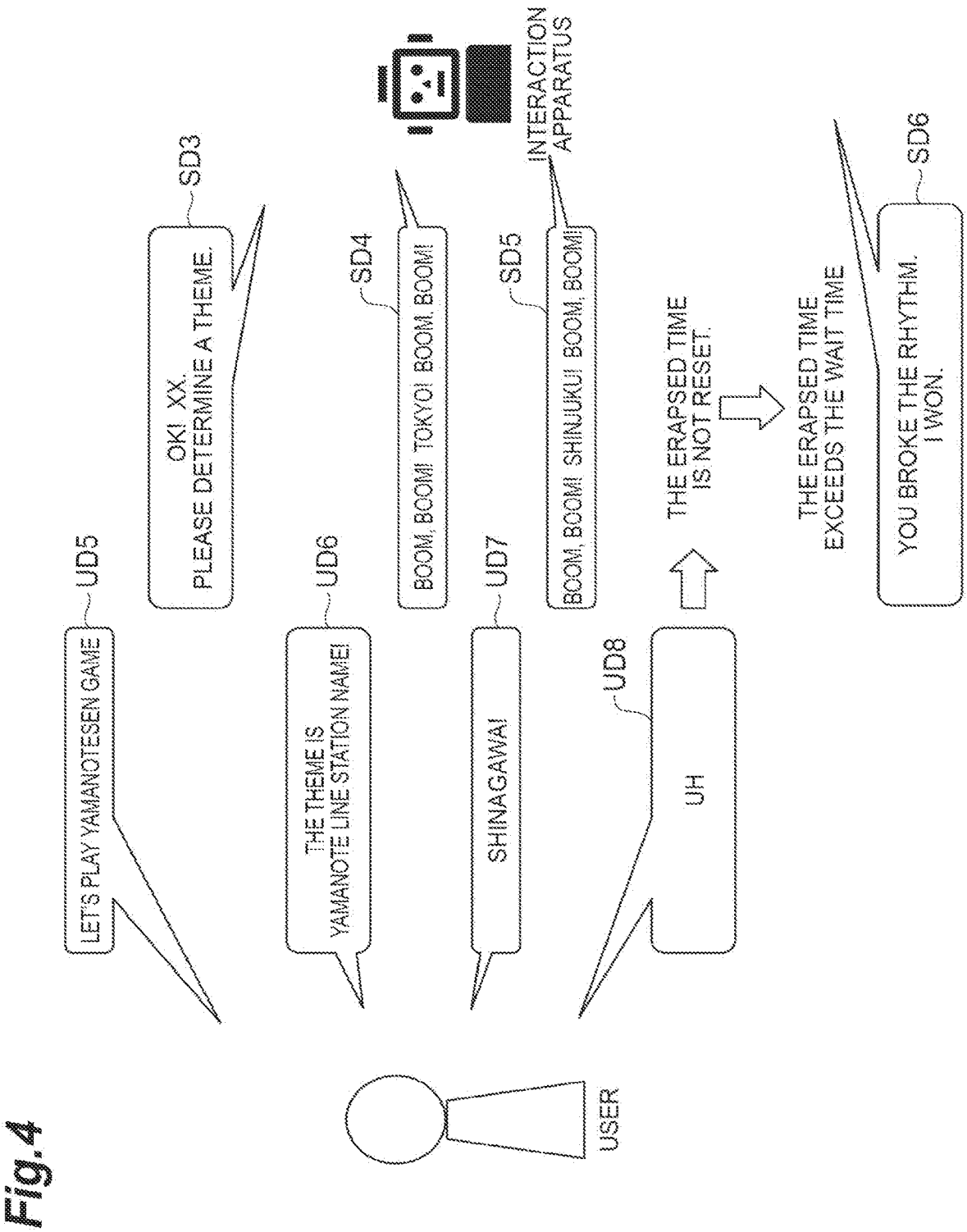
FIG. 4 is a diagram showing an example of interaction between the user and the system.

On the other hand, the example of FIG. 4 shows a scene in which a rhythm game (here, as an example, Yamanotesen game) is played in which it is necessary to provide a time limit within which the user can answer between the user and the system. In this example, first, the user inputs a user utterance UD5 of "Let's play Yamanotesen game" to the microphone 22. Then, the interaction apparatus 10 analyzes the intention of the user utterance UD5, and displays a system message SD3 of "OK! XX. Please determine a theme." is output to the user. Note that the name of the user registered in advance is entered in "XX" of the system message SD3. Subsequently, the user inputs a user utterance UD6 of "The theme is Yamanote Line Station Name!". After that, the system message SD4 of "Boom, boom! Tokyo! Boom, boom!" is output by the interaction apparatus 10. And then, the user replies a user utterance UD7 of "Shinagawa!" the interaction apparatus 10 replies a system message SD5 of "Boom, boom! Shinjuku! Boom, boom!". In this example, after the system message SD5 is output, before the elapsed time exceeds the wait time set in the system message SD5, a user utterance UD8, which is a filler "Uh" is input. Here, the system message SD5 is an utterance during the rhythm game, and requests the user to answer within a predetermined time limit. Therefore, in this case, unlike the example of FIG. 3, the interaction apparatus 10 does not subtract elapsed time in response to receiving the user utterance UD8 which is a filler. By such a process, it is possible to appropriately prevent the time during which the user can answer the rhythm game from being extended due to the user uttering the filler during the rhythm game. As a result, when the interaction apparatus 10 detects that the elapsed time from the time point when the system message SD5 is output exceeds the wait time, the interaction apparatus 10 can appropriately generate and output a system message SD6 of "You broke the rhythm. I won.". That is, a game with high fairness can be realized between the user and the system.

As described above, when the user makes a statement (for example, "filler") that does not correspond to an answer to the system message, the interaction apparatus 10 can appropriately switch the handling of the statement in accordance with the state of interaction between the user and the system. That is, the interaction apparatus 10 can appropriately switch whether or not to subtract the elapsed time in response to receiving the message. Hereinafter, functions of the interaction apparatus 10 for realizing the interaction as shown in FIGS. 2 to 4 will be described.

As shown in FIG. 1, the interaction apparatus 10 includes a dialogue generator 11, an outputting unit 12, an acquiring unit 13, a setting unit 14, a user utterance acquiring unit 15, a measuring unit 16, a controller 17, and a profile storage 18.

The dialogue generator 11 generates a system message to be output to the user. As in the examples of FIGS. 2 to 4, the dialogue generator 11 generates a system message on the basis of, for example, an analysis result of an intention of a speech (user utterance acquired by a user utterance acquiring unit 15 described later) from a user to the system and a preprogrammed dialogue generation rule. The dialogue generator 11 may newly generate the content of the system message, or may generate the system message to be output to the user by acquiring information of the system message stored in advance in a database or the like. For example, the dialogue generator 11 may acquire a system message corresponding to a predetermined dialogue pattern from a database in which system messages for a plurality of dialogue patterns are stored in advance. The system message generated by the dialogue generator 11 may be voice information, display information such as text, or information including both of them. In the present embodiment, the system message generated by the dialogue generator 11 includes both the voice information and the display information (text).

The outputting unit 12 outputs (transmits) the system message (here, voice information) generated by the dialogue generator 11 to the user terminal 20. The system message transmitted to the user terminal 20 is output to the user from the speaker 21 of the user terminal 20.

The acquiring unit 13 acquires a system message for the user. In the present embodiment, the acquiring unit 13 acquires the system message generated by the dialogue generator 11.

The setting unit 14 sets a wait time for receiving an answer from the user based on the system message acquired by the acquiring unit 13. Specifically, the setting unit 14 sets a wait time corresponding to the content of the system message. In the present embodiment, the setting unit 14 includes a classification model 14*a* and a decision model 14*b*.

The classification model 14*a* is a learned model that is machine-learned so as to input information based on a system message and output classification information indicating whether or not the system message is a message which requests the user to answer. The classification information is, for example, flag information in which a case where the system message is a message which requests the user to answer is represented by "1" and a case where the system message is not a message which requests the user to answer is represented by "0". Alternatively, the classification information may be a value indicating a probability that the system message corresponds to a message which requests the user to answer. The classification model 14*a* may be generated by, for example, machine learning using an SVM or machine learning using a neural network such as a multilayer perceptron (MLP) or a long short term memory (LSTM). For example, pair information including information based on a system message corresponding to an input of the classification model 14*a* and information indicating whether the system message corresponds to a message which requests the user to answer may be used as training data for machine learning for the classification model 14*a*. As the information indicating whether or not the system message in the teacher data corresponds to the message which requests the user to answer, for example, flag information indicating a case corresponding to the message which requests the user to answer by "1" and indicating a case not corresponding to the message which requests the user to answer by "0" can be used.

As the input information (information based on the system message) to the classification model 14*a*, for example, a feature amount extracted based on a predetermined rule such as "Whether or not a specific keyword (for example, a symbol "?" attached to the end of a word) suggesting a question to the user is included in the system message", or "Whether or not a keyword specific to the game (for example, "Boom, boom" in the above-described Yamanotesen game) is included" can be used. Vector information obtained by vectorizing the contents of the system message using a known document vectorization method such as Doc2Vec may be used as input information to the classification model 14*a*. Further, both the feature amount and the vector information may be used as input information to the classification model 14*a*.

The decision model 14*b* is a learned model that is machine-learned to input information based on a system message and output a wait time corresponding to the system message. For example, the decision model 14*b* may be generated by machine learning using an SVM, a neural network, or the like. For example, pair information including information based on a system message corresponding to an input of the decision model 14*b* and a wait time corresponding to the system message (for example, a wait time considered to be optimal determined by an operator or the like based on a predetermined criterion) can be used as training data for machine learning for the decision model 14*b*.

The input information (information based on the system message) to the decision model 14*b* may be, for example, the same as the input information (the feature amount, the vector information, and the like) to the classification model 14*a* described above, or may be other information (for example, information such as the number of sentences, the number of words, and the number of characters included in the text of the system message). A combination of these pieces of information may be used as input information to the decision model 14*b*. The information of the wait time output from the decision model 14*b* may be a continuous value (fine real value) or a discrete value (for example, "short (5 seconds)", "long (10 seconds)", or the like).

The setting unit 14 sets the wait time by using the classification model 14*a* and the decision model 14*b* as follows. That is, the setting unit 14 acquires the classification information by inputting information based on the system message to the classification model 14*a*. Then, when the acquired classification information indicates that the message is a message which requests the user to answer, the setting unit 14 acquires and sets the wait time by inputting information based on the system message to the decision model 14*b*.

When the acquired classification information does not indicate that the message is a message which requests the user to answer, the setting unit 14 does not need to set the wait time, and thus can omit setting the wait time using the decision model 14b. This makes it possible to omit unnecessary calculation processing and save computer resources such as a processor and a memory. Further, the classification model 14a and the decision model 14b described above do not necessarily have to be separated as separate models, and may be realized as one model connected to each other. The setting unit 14 may set the wait time using only the decision model 14b without using the classification model 14a. In this case, the wait time is also set for a system message that does not correspond to a message which requests the user to answer. Therefore, for example, for such a system message, the decision model 14b may be adjusted so that a wait time that is large enough to be regarded as that a wait time is substantially not set.

The setting unit 14 may set the wait time by further using profile information related to the attribute of the user. For example, the above-described decision model 14b may be machine-learned so as to further input profile information on the attribute of the user and output the wait time. The profile information is stored in a profile storage 18 that can be referred to by the setting unit 14. The profile information may include static profile information and dynamic profile information. The static profile information is information that is updated relatively infrequently such as the age, sex, hometown, and personality of the user. The dynamic profile information is obtained from the history of interactions between the user and the interaction apparatus 10 in the past, and is updated relatively frequently. The dynamic profile information is, for example, information such as a history of the past user utterance (contents of the user utterance, an interval from when the system message is output to when the user utterance is performed, and the like), a current context of the user (information such as a mental state of the user, an operation state of the user, an environment surrounding the user, and the like) estimated from the history of the latest user utterance.

For example, it is considered preferable to set a longer wait time for a user who has an averagely long interval between the output of the system message and the user utterance than for a user who has an averagely short interval. Whether such an interval is long or short on average can be read from, for example, the age, personality, and the like stored as the static profile, the interval from the output of the system message to the user utterance, and the like stored as the dynamic profile. Therefore, by using the profile information, it is possible to set a wait time more suitable for the user.

The user utterance acquiring unit 15 acquires a user utterance. In the present embodiment, the user utterance is acquired by the microphone 22 of the user terminal 20 and transmitted to the interaction apparatus 10. The user utterance acquiring unit 15 receives the user utterance from the user terminal 20. The user utterance acquiring unit 15 outputs the user utterance to the measuring unit 16.

The measuring unit 16 has a timer function of measuring elapsed time after the system message is output to the user. For example, the measuring unit 16 starts measurement of elapsed time with a time point at which the outputting unit 12 outputs a system message to the user terminal 20 as a measurement start time point. The measuring unit 16 may stop measuring the elapsed time while the user is performing voice input (utterance) to the microphone 22. For example, the measuring unit 16 may temporarily stop the measurement of the elapsed time at the time when the voice input from the user to the microphone 22 is started (that is, at the time when the start of the voice input is notified from the user terminal 20 to the interaction apparatus 10), and may resume the measurement of the elapsed time after the voice input is ended. However, when the user utterance is a filler and the system message satisfies a predetermined condition (described later in detail), the measuring unit 16 may measure elapsed time for a period (filler section) in which the user utterance is performed. That is, the elapsed time may be advanced in the filler section.

In the present embodiment, the measuring unit 16 performs the following processing when acquiring the user utterance from the user utterance acquiring unit 15 after the system message which requests the user to answer is output to the user. The measuring unit 16 performs speech recognition on the user utterance, which is the received voice, and acquires a text, which is the speech recognition result. The measuring unit 16 can perform the speech recognition by using a conventionally known speech recognition method. For example, the measuring unit 16 converts the speech waveform of the user utterance into a phoneme string based on an acoustic model prepared in advance. For example, the speech waveform of the user utterance "Tenki ga ii (The weather is good)" (at this time, the meaning of "Tenki ga ii" is not interpreted) is converted into the phoneme string "tenkigaii". Next, the measuring unit 16 converts the phoneme string into a text based on a language model prepared in advance. For example, for the phoneme string "tenkigaii", there are various conversion candidates such as "Weather is good", "The weather is good", "It is good weatehr". The measuring unit 16 selects the most appropriate conversion candidate according to the score calculated by the language model. As a result, a text that is a speech recognition result is acquired.

The measuring unit 16 determines whether or not the user utterance corresponds to an answer to the system message based on the speech recognition result of the user utterance obtained by the speech recognition as described above. For example, the measuring unit 16 may store in advance a keyword or the like included in an expected answer to the system message, and perform the determination based on whether or not the speech recognition result of the user utterance includes the keyword. When it is determined that the user utterance corresponds to the answer to the system message, the interaction apparatus 10 performs predetermined processing. For example, the dialogue generator 11 may generate the following system dialogue in accordance with the content of the user utterance.

On the other hand, when it is not determined that the user utterance corresponds to the answer to the system message (that is, when the user utterance not corresponding to the answer to the system message is acquired by the user utterance acquiring unit 15 after the system message is output), the measuring unit 16 determines whether or not to subtract the elapsed time based on the system message and the user utterance. Specifically, the measuring unit 16 determines not to subtract elapsed time when the user utterance is a filler and the system message meets a predetermined condition. On the other hand, when the user utterance is filler and the system message does not meet the predetermined condition, the measuring unit 16 determines to subtract elapsed time. Here, the predetermined condition is, for example, that it is necessary to treat a time during which the user can answer (that is, wait time) as an absolute time limit. In the present embodiment, the predetermined condition is that the system message corresponds to a system message in a game in which words along a predetermined theme are alternately answered between the user and the system (hereinafter referred to as a "rhythm game").

Whether or not the user utterance is a filler is determined as follows, for example. The measuring unit 16 determines whether the user utterance is a filler based on the speech recognition result of the user utterance. For example, the measuring unit 16 determines whether or not the user utterance is a filler by using a detection model 16a that is machine-learned to input a speech recognition result of the user utterance and output an estimation result of whether or not the user utterance is a filler. The detection model 16a can be generated by machine learning using, for example, an SVM, a neural network, or the like. For example, pair information including information corresponding to the speech recognition result of the user utterance corresponding to the input of the detection model 16a and flag information indicating whether the user utterance is a filler (for example, information indicating "1" when the user utterance is a filler and "0" when the user utterance is not a filler) can be used as training data for machine learning for the detection model 16a.

The measuring unit 16 may also determine whether the user utterance is a filler based on the profile information described above. For example, the detection model 16a described above may be machine-learned to further input profile information and output the estimation result. For example, a word that plays a role as a filler for a certain user may be a word that does not play a role as a filler for another user (for example, a word that does not play a role as a word that fills pause until the next speech, such as a simple mouth habit). Then, the profile information (for example, the content of the past user utterance stored as a dynamic profile) is useful for estimating whether or not a word included in the user utterance of a certain user is a filler for the user. Therefore, by using the profile information, it is possible to more accurately determine whether or not the user utterance is a filler.

The measuring unit 16 may determine whether or not the user utterance is a filler by a predetermined rule-based process without using the detection model 16a. For example, the measuring unit 16 may determine that the user utterance is a filler when the speech recognition result of the user utterance includes a keyword indicating that the user utterance is a filler. Such keywords can be set in advance by an operator or the like.

Whether or not the system message satisfies the predetermined condition is determined, for example, as follows. The measuring unit 16 acquires the system message from the acquiring unit 13, and determines whether or not the system message satisfies the predetermined condition based on the text information indicating the content of the system message. When the system message acquired from the acquiring unit 13 is only voice information, the measuring unit 16 can acquire the text information by performing speech recognition on the system message. For example, the measuring unit 16 determines that the system message matches the predetermined condition when the text information includes a keyword (for example, a keyword such as "Boom, boom" in the case of the Yamanotesen game illustrated in FIG. 4) used in advance in the turn of the system in the rhythm game. The determination as to whether or not the system message satisfies the predetermined condition may be made in advance before the user utterance is acquired by the user utterance acquiring unit 15.

When it is determined that the user utterance is a filler and the system message satisfies the predetermined condition by the determination processing as described above, the measuring unit 16 determines not to subtract elapsed time. According to such processing, when the user utters a filler (user utterance UD8) in the turn of the user during the rhythm game as shown in FIG. 4, elapsed time is not reset (subtracted). As a result, a game with high fairness is realized.

On the other hand, when it is determined that the user utterance is filler and the system message does not meet the predetermined condition, the measuring unit 16 determines to subtract elapsed time. For example, the measuring unit 16 may set the elapsed time to 0 second by resetting the elapsed time (for example, t1 seconds) measured with the time point at which the system message is output as the start time point. Alternatively, the measuring unit 16 may set the elapsed time to t2 (0<t2<1) by partially rewinding the elapsed time. According to such a process, when the user utters a filler (user utterance UD3) in a scene of daily conversation as shown in FIG. 3, elapsed time is reset (subtracted). As a result, it is possible to appropriately extend the time during which the user can answer.

The measuring unit 16 may locally process the speech recognition of the user utterance, or may transmit the speech waveform to a speech recognition server different from the interaction apparatus 10 and acquire the speech recognition result from the speech recognition server. In addition, the speech recognition may be performed in real time on a voice waveform transmitted from the user terminal 20 to the interaction apparatus 10 at any time during a series of voice inputs of the user to the microphone 22. In this case, the measuring unit 16 may perform the above-described processing on the speech recognition result acquired at any time. Alternatively, the speech recognition may be performed on a voice waveform collectively transmitted from the user terminal 20 to the interaction apparatus 10 at a time point when a series of voice inputs of the user is completed (for example, at a time point when the voice of the user is not detected by the microphone 22 for a certain period of time or more).

The controller 17 acquires the wait time W from the setting unit 14, and acquires the elapsed time T measured by the measuring unit 16 at any time. When the elapsed time T measured by the measuring unit 16 exceeds the wait time W (i.e., "T>W"), the controller 17 controls a dialog with the user so that an additional system message (additional action) corresponding to the system message is output to the user. In the present embodiment, the controller 17 instructs the dialogue generator 11 to generate the additional system message. The content of the additional system message is generated based on the content of the previous system message and a predetermined dialog generation rule. As a result, when the elapsed time after the system messages SD1 and SD5 are output to the user exceeds the wait time set by the setting unit 14 for the system messages SD1 and SD5 as in the examples of FIGS. 2 and 4, the additional system messages SD2 and SD6 are output to the user.

Figure 5:
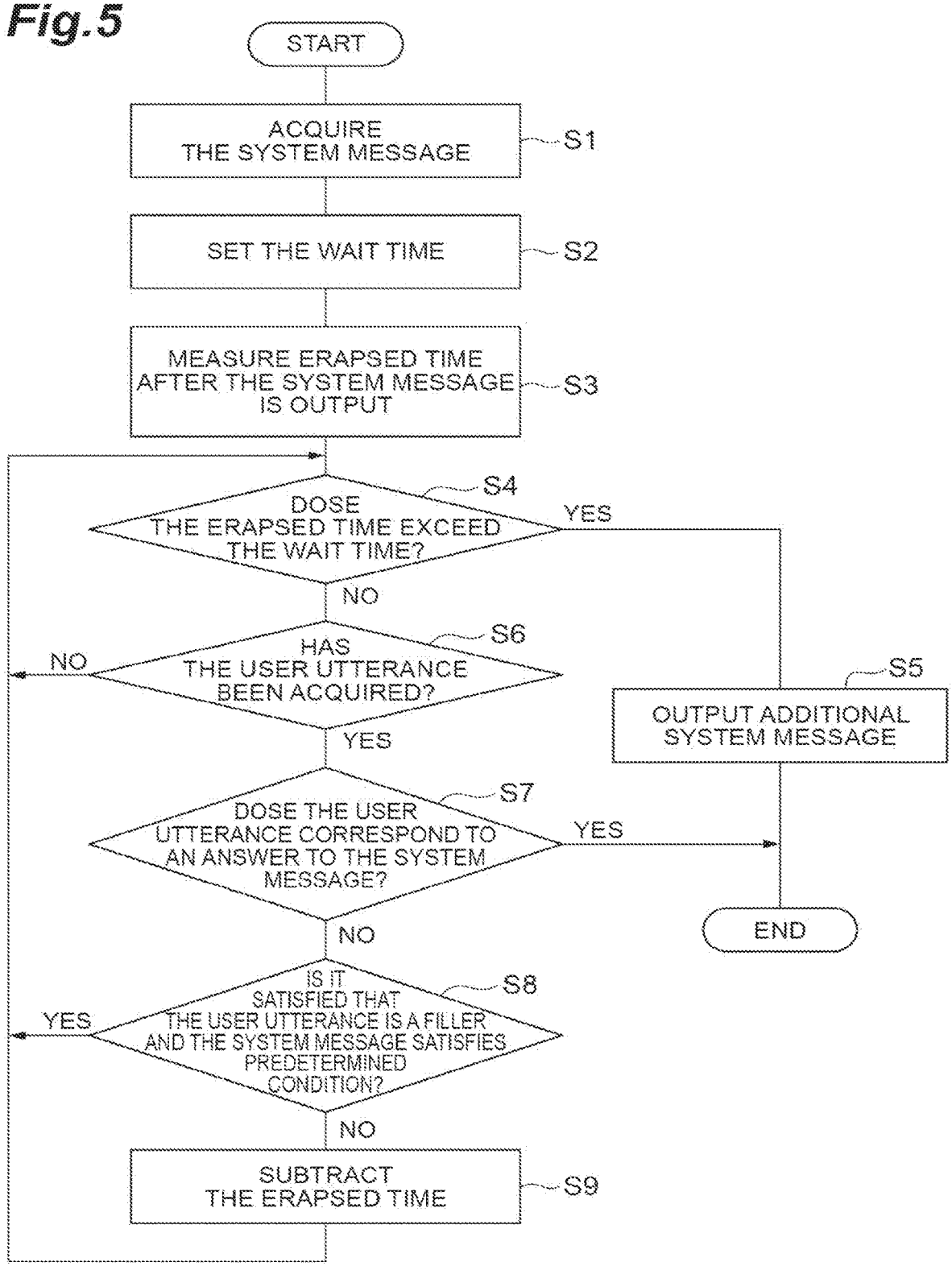
FIG. 5 is a flowchart illustrating an example of an operation of the interaction apparatus of FIG. 1.

Next, an example of the operation (interaction control method) of the interaction apparatus 10 will be described with reference to FIG. 5. First, the acquiring unit 13 acquires the system message generated by the dialogue generator 11 (step S1). The system message acquired by the acquiring unit 13 (i.e., the system message generated by the dialogue generator 11) is transmitted to the user terminal 20 by the outputting unit 12 in parallel. Here, the following description will be given on the assumption that the system message corresponds to a message which requests the user to answer.

Subsequently, the setting unit 14 sets the wait time W for the system message based on the system message acquired by the acquiring unit 13 (step S2). The measuring unit 16 measures elapsed time T after the system message is output to the user (i.e., after the interaction apparatus 10 becomes a state capable of receiving a response from the user) (step S3).

Subsequently, after the system message is output to the user, the controller 17 determines whether the elapsed time T exceeds the wait time W (step S4). When it is determined that the elapsed time T exceeds the wait time \V (step S4: YES), the controller 17 controls the interaction with the user so that an additional system message is output to the user (step S5). As an example, the controller 17 causes the dialogue generator 11 to generate the additional system message. As a result, the system messages SD2 and SD6 shown in the examples of FIGS. 2 and 4 are output to the user.

On the other hand, when the elapsed time T does not exceed the wait time W (step S4: NO), the determination process of step S4 is executed at any time until the user utterance is acquired by the user utterance acquiring unit 15 (step S6: NO→step S4). When the user utterance is acquired by the user utterance acquiring unit 15 (step S6: YES), the measuring unit 16 determines whether or not the user utterance corresponds to an answer to the system message output in step S1 (step S7).

If it is determined that the user utterance corresponds to an answer to the system message (step S7: YES), a series of interaction processes (i.e., interaction processes for one round trip from the output of the system message to the acquisition of the user utterance as an answer to the system message) ends normally.

On the other hand, when it is not determined that the user utterance corresponds to the answer to the system message (step S7: NO), the measuring unit 16 determines whether or not the user utterance is a filler and the system message satisfies a predetermined condition (step S8). In the present embodiment, the measuring unit 16 determines whether or not the user utterance is a filler and the system message corresponds to the system message in the rhythm game.

When it is determined that the user utterance is filler and the system message satisfies the predetermined condition (step S8: YES), the measuring unit 16 continues to measure elapsed time without subtracting elapsed time. Further, the measuring unit 16 may add, to the elapsed time, a time corresponding to a filler section in which a filler has been input in a period in which the measurement of the elapsed time is stopped during the voice input of the user. As a result, as in the example of FIG. 4, when the user utters filler (user utterance UD8) in the turn of the user during the rhythm game, the elapsed time is not subtracted, and thus a game with high fairness is realized.

On the other hand, when it is determined that the user utterance is filler and the system message does not satisfy the predetermined condition (step S8: NO), the measuring unit 16 subtracts the elapsed time (step S9). As a result, as in the example of FIG. 3, when the user utters a filler (user utterance UD3) in a scene of daily interaction, the elapsed time is subtracted, and the time in which the user can answer is appropriately extended. After step S8 or step S9, the process of step S4 is executed again.

In the interaction apparatus 10 described above, the setting unit 14 sets the wait time based on the system message. When the elapsed time after the system message is output to the user exceeds the wait time, the controller 17 controls the interaction with the user so that an additional system message is output to the user. According to this configuration, when the user is lost for words, communication can be promoted by further speaking from the system side. Further, in the interaction apparatus 10, when the user utterance not corresponding to the answer to the system message is acquired, the measuring unit 16 determines whether or not to subtract the elapsed time based on the system message and the user utterance. With such a process, it is possible to appropriately switch whether or not the elapsed time is to be subtracted in accordance with the state of the dialogue between the system and the user. As a result, more natural interaction between the user and the system can be realized.

Further, the measuring unit 16 determines not to subtract the elapsed time when the user utterance is a filler and the system message meets a predetermined condition, and determines to subtract the elapsed time when the user utterance is a filler and the system message does not meet the predetermined condition. According to the above configuration, it is possible to appropriately determine the handling of the filler (that is, whether or not to subtract elapsed time) in accordance with the content of the system message.

The predetermined condition includes a condition that the system message corresponds to a system message in the rhythm game. According to the above configuration, it is possible to appropriately determine not to subtract elapsed time in a situation in which the rhythm game is played between the user and the system in which it is not appropriate to subtract elapsed time when the user utters filler. As a result, as in the example of FIG. 4, a game with fairness can be realized.

Further, the measuring unit 16 determines whether or not the user utterance is a filler by using the detection model 16*a* that is machine-learned so as to input a speech recognition result of the user utterance and output an estimation result of whether or not the user utterance is a filler. According to the above configuration, by using the detection model 16*a*, which is a learned model generated by machine learning, the user utterance, which is a filler, can be easily and accurately detected.

Further, the measuring unit 16 determines whether or not the user utterance is a filler based on profile information on the attribute of the user. According to the above configuration, the attribute of the user is also taken into consideration, so that the user utterance as the filler can be detected with higher accuracy.

Further, the setting unit 14 sets the wait time by using the decision model 14*b* that is machine-learned so as to input information based on the system message and output the wait time corresponding to the system message. According to the above configuration, the wait time can be appropriately and easily determined by using the decision model 14*b*, which is a learned model constructed by machine learning.

Further, the decision model 14*b* is machine-learned so as to further input profile information on the attribute of the user and output the wait time. According to the above configuration, the wait time can be determined more appropriately by taking into account the attribute of the user.

The setting unit 14 includes a classification model 14*a* that is machine-learned so as to input information based on a system message and output classification information indicating whether or not the system message is a message which requests the user to answer. Then, the setting unit 14 acquires the classification information by inputting the information based on the system message to the classification model 14*a*, and acquires and sets the wait time by inputting the information based on the system message to the decision model 14b when the acquired classification information indicates that the system message is a message which requests the user to answer. According to the above configuration, it is possible to appropriately determine whether or not it is necessary to set the wait time (that is, whether or not the system message is a message that requests the user to answer) by the classification model 14a, and then set the wait time by using the decision model 14b only when it is necessary. As a result, unnecessary setting of the wait time using the decision model 14b can be avoided, and occurrence of an unexpected failure event caused by setting the wait time when setting of the wait time is unnecessary can be prevented.

Second Embodiment

Figure 6:
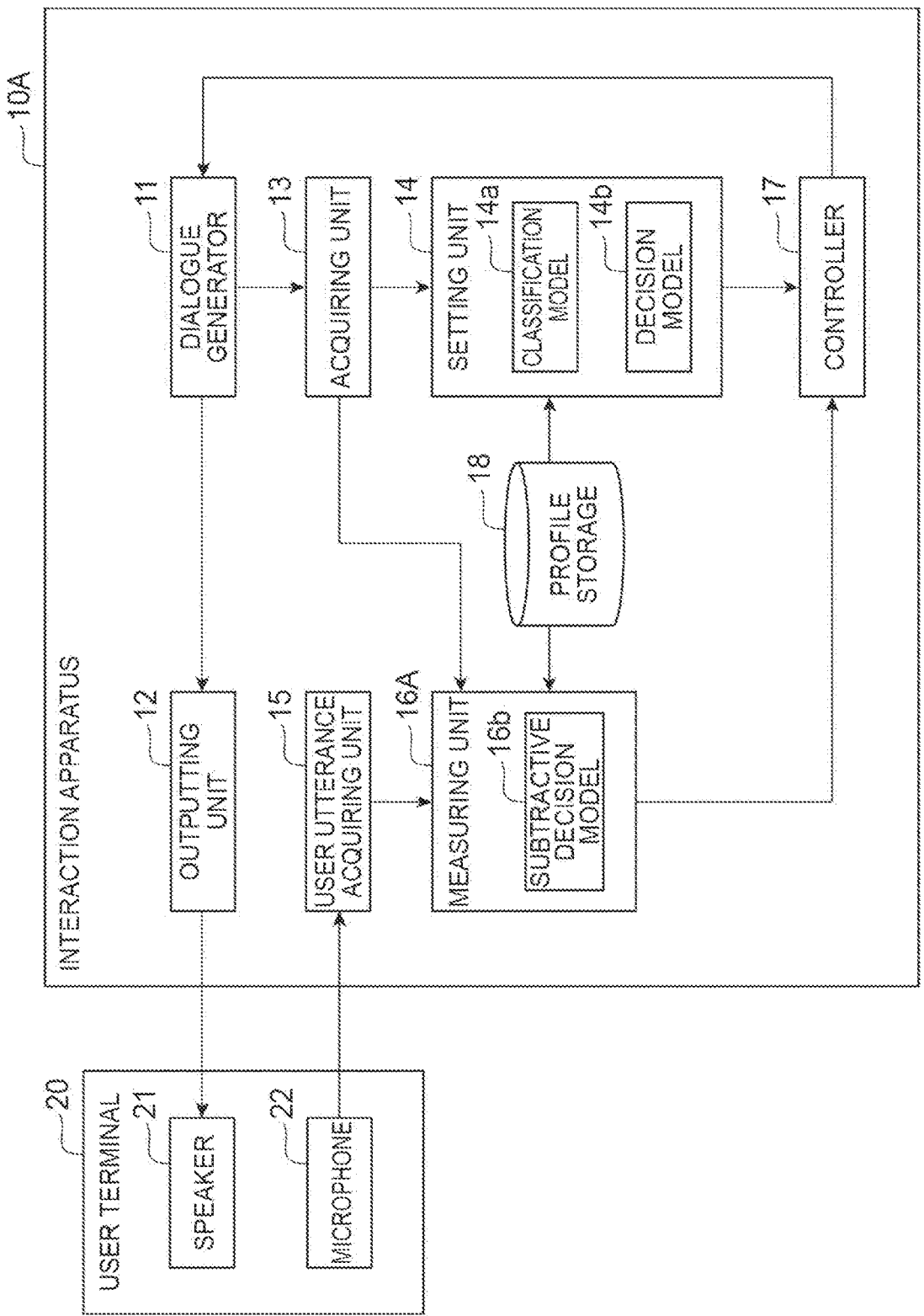
FIG. 6 is a diagram illustrating a functional configuration of an interaction apparatus according to the second embodiment.

FIG. 6 is a diagram illustrating a functional configuration of an interaction apparatus 10A according to the second embodiment. The interaction apparatus 10A is different from the interaction apparatus 10 in that a measuring unit 16A is provided instead of the measuring unit 16, and other configurations are similar to those of the interaction apparatus 10. The measuring unit 16A differs from the measuring unit 16 in that it has a subtractive decision model 16b instead of the detection model 16a. Hereinafter, the configuration of the interaction apparatus 10A different from that of the interaction apparatus 10 will be described.

When the user utterance not corresponding to the answer to the system message is acquired by the user utterance acquiring unit 15 after the system message is output, the measuring unit 16A determines whether or not to subtract the elapsed time by using the subtractive decision model 16b. The subtractive decision model 16b is a learned model that is machine-learned to input information based on a system message and a speech recognition result of a user utterance and output information indicating whether or not to subtract elapsed time. The subtractive decision model 16b can be generated by machine learning using, for example, an SVM, a neural network, or the like. The subtractive decision model 16b realizes, by a machine learning model, the determination process (determination as to whether or not the user utterance is a filler and the system message satisfies a predetermined condition) performed by the measuring unit 16 based on the rule-based process.

As the information based on the system message input to the subtractive decision model 16b, the same information as the information based on the system message input to the classification model 14a or the decision model 14b can be used. In addition, information on a dialogue state (for example, a chat, a rhythm game, or the like) estimated from the content of the system message (for example, a keyword or the like included in the system message) may be used as information based on the system message input to the subtractive decision model 16b. The conversation state information may be expressed as, for example, a one-hot vector.

As the speech recognition result of the user utterance input to the subtractive decision model 16b, information similar to the speech recognition result of the user utterance input to the detection model 16a described above can be used.

The information indicating whether or not to subtract the elapsed time output from the subtractive decision model 16b is, for example, flag information indicating that the elapsed time is to be subtracted by "1" and that the elapsed time is not to be subtracted by "0". The information indicating whether or not to subtract elapsed time may be a value indicating a probability that elapsed time should be subtracted (or should not be subtracted). Alternatively, the information indicating whether or not the elapsed time is to be subtracted may be information including an adjustment amount of the elapsed time (a rewinding time or the like).

As the training data for learning the subtractive decision model 16b, pair information including information corresponding to each of the information based on the system message and the speech recognition result of the user utterance and information corresponding to information indicating whether or not to subtract elapsed time output by the subtractive decision model 16b (for example, the flag information, the adjustment amount of elapsed time, and the like) can be used. Here, the information corresponding to the information indicating whether or not to subtract the elapsed time is, for example, information obtained by the operator determining whether or not the user utterance is a filler and the system message satisfies a predetermined condition and determining an appropriate adjustment amount of the elapsed time.

In addition, the subtractive decision model 16b may be machine-learned so as to further input profile information on the attribute of the user and output information indicating whether or not to subtract elapsed time. In this case, the same effect as in the case of inputting profile information to the detection model 16a described above can be obtained. That is, in the internal processing of the subtractive decision model 16b, it is possible to accurately estimate whether or not the user utterance is a filler.

Figure 7:
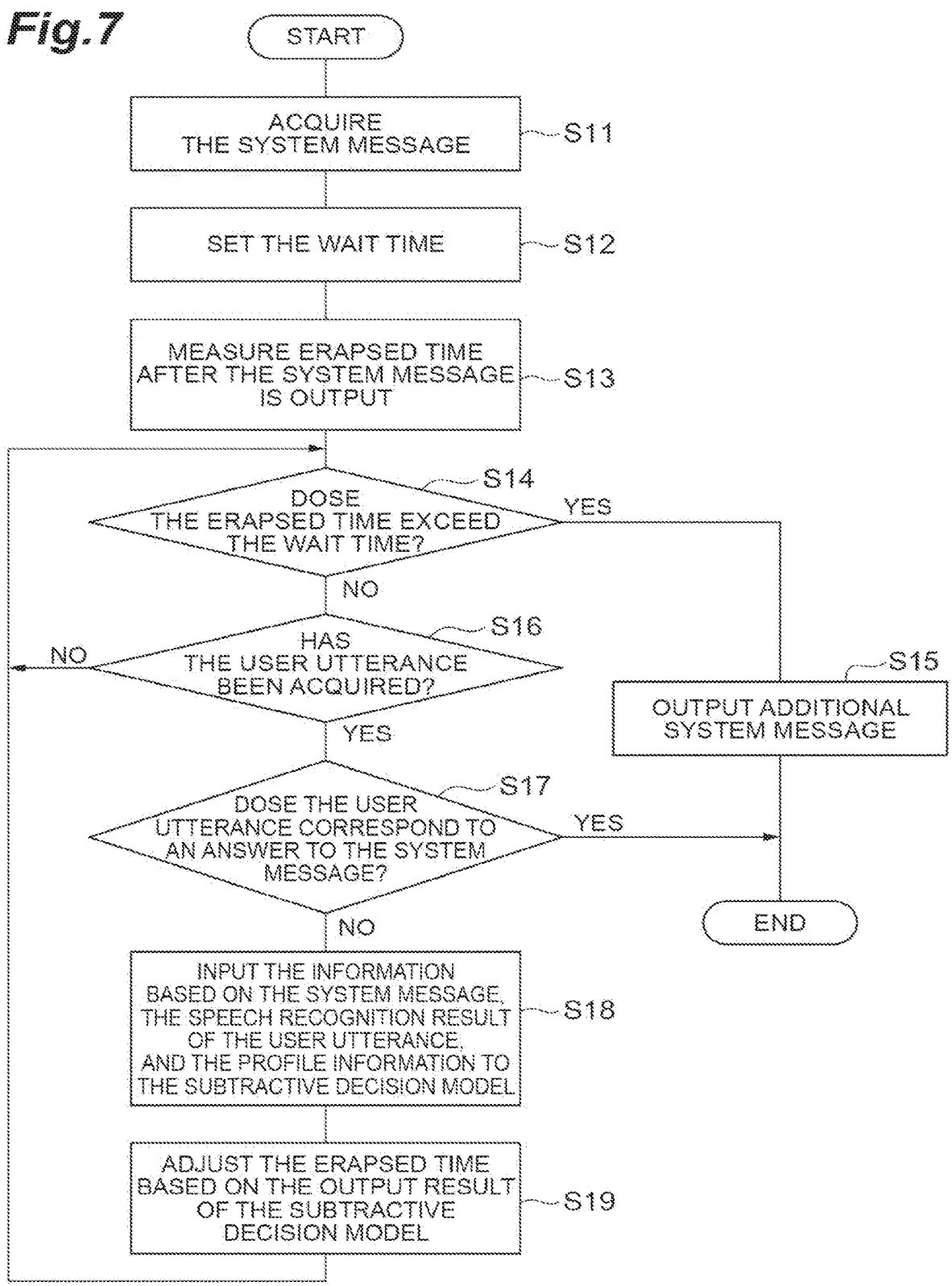
FIG. 7 is a flowchart illustrating an example of an operation of the interaction apparatus of FIG. 6.

Next, an example of the operation of the interaction apparatus 10A will be described with reference to FIG. 7. The operation of interaction apparatus 10A in FIG. 7 (steps S11 to S17) is the same as the operation of interaction apparatus 10 in FIG. 5 (steps S1 to S7). Therefore, processes (steps S18 and S19) different from the operation of the interaction apparatus 10 will be described.

In step S18, the measuring unit 16A inputs the information based on the system message, the speech recognition result of the user utterance, and the profile information to the subtractive decision model 16b. As a result, the subtractive decision model 16b outputs information indicating whether or not to subtract elapsed time. Subsequently, in step S19, the measuring unit 16A adjusts the elapsed time based on the output result of the subtractive decision model 16b. For example, when the output result of the subtractive decision model 16b is information indicating that the elapsed time should not be subtracted, the measuring unit 16A continues to measure the elapsed time without subtracting the elapsed time, as in the process of "step S8: YES" described above. On the other hand, when the output result of the subtractive decision model 16b is information indicating that elapsed time should be subtracted, the measuring unit 16A subtracts elapsed time as in step S9 described above. When the output result of the subtractive decision model 16b is information indicating the adjustment amount of elapsed time, the measuring unit 16A may specifically adjust the elapsed time based on the adjustment amount.

In the interaction apparatus 10A described above, the measuring unit 16A determines whether or not to subtract elapsed time by using the subtractive decision model 16b that is machine-learned to input information based on the system message and information based on the user utterance and output information indicating whether or not to subtract elapsed time. According to the above configuration, by using the subtractive decision model 16b which is a learned model constructed by machine learning, it is possible to appropriately and easily determine whether or not to subtract elapsed time.

In addition, the subtractive decision model 16b is machine-learned so as to further input profile information on the attribute of the user and output information indicating whether or not to subtract the elapsed time. According to the above configuration, it is possible to more appropriately determine whether or not the elapsed time is to be subtracted by taking into account the attribute of the user.

As described above, in the first embodiment and the second embodiment, when the elapsed time T measured by the measuring unit 16 exceeds the wait time W, the controller 17 controls the interaction with the user so that the additional system message as an example of the additional action for the user is output to the user. However, the additional action for the user may include a form other than the above-described additional system message. For example, the additional action may be a voice other than a conversation from the speaker 21 of the user terminal 20 (for example, a bell sound, music giving a feeling of tension to the user, or the like), or may be actuation of vibration of the user terminal 20. In addition, in a case where the interface for the user is not the user terminal 20 such as a smartphone but a humanoid robot or the like that faces the user and performs a dialogue with the user, the additional action may be to cause the humanoid robot to perform an operation that prompts the user to make a next utterance.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 8:
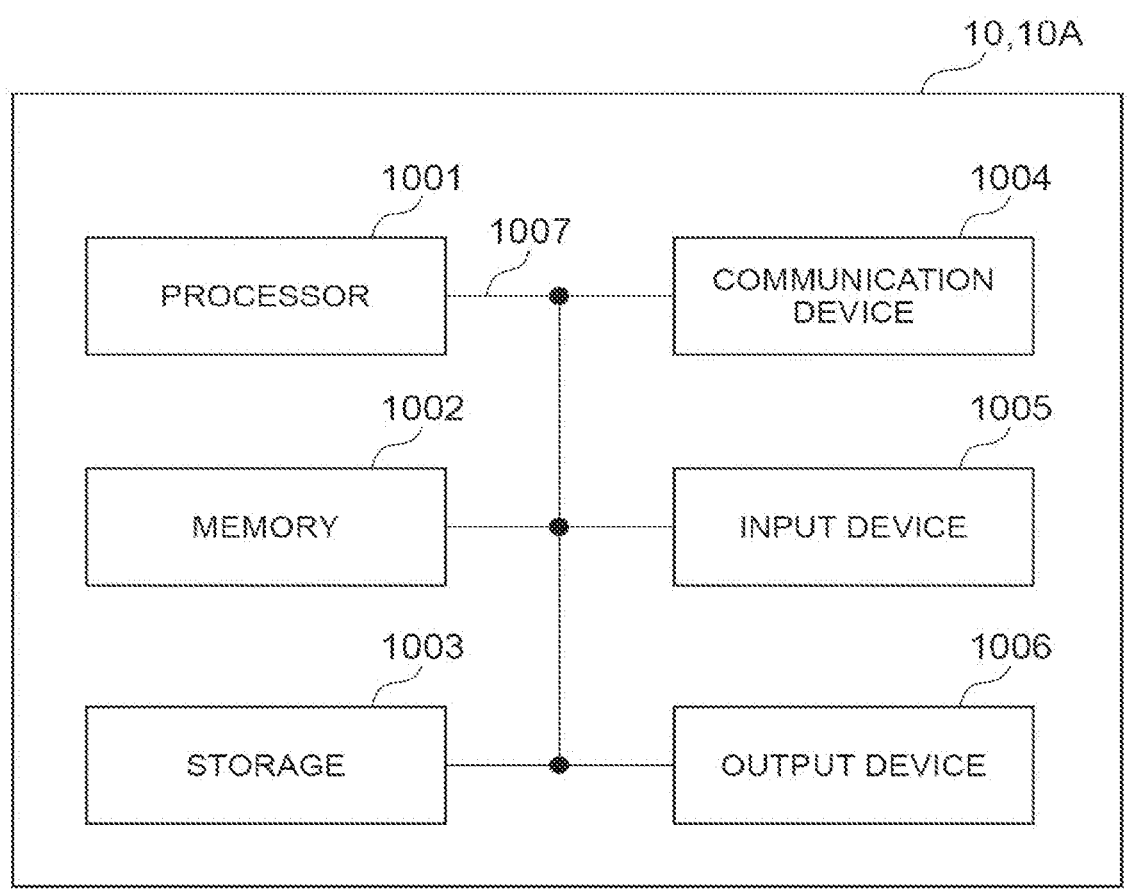
FIG. 8 is a diagram illustrating an example of a hardware configuration of the interaction apparatus.

For example, the interaction apparatus 10, 10A according to an embodiment of the present invention may function as a computer that performs the communication control method of the present disclosure. FIG. 8 is a diagram illustrating an example of a hardware configuration of the interaction apparatus 10, 10A according to the embodiment of the present disclosure. The interaction apparatus 10, 10A described above may be physically configured as a computer device including a processor 1001, a memory 1002, a storage 1003, a communication device 1004, an input device 1005, an output device 1006, a bus 1007, and the like. The hardware configuration of the user terminal 20 described above may be configured as a computer device similar to the interaction apparatus 10, 10A.

In the following description, the term "device" can be referred to as a circuit, a device, a unit, or the like. The hardware configuration of the interaction apparatus 10, 10A may include one or a plurality of devices illustrated in FIG. 8, or may be configured without including some of the devices.

Each function in the interaction apparatus 10, 10A is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, the measuring unit 16, 16A may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the communication control method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel). The monitor 10a described above is included in the output device 1006.

Further, the respective devices such as the processor 1001 and the memory 1002 are connected by the bus 1007 for information communication. The bus 1007 may be configured using a single bus or may be configured using buses different between the devices.

Further, the interaction apparatus 10, 10A may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as a, an, and the in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST

10 interaction apparatus
13 acquiring unit
14 setting unit
14a classification model
14b decision model
15 user utterance acquiring unit
16, 16A measuring unit
16a detection model
16b subtractive decision model
17 controller.

The invention claimed is:

1. An interaction apparatus comprising:
processing circuitry configured to
acquire a system message for a user;
set a wait time for receiving an answer from the user based on the system message;
measure an elapsed time after the system message is output to the user;
acquire a user utterance uttered by the user; and
control an interaction with the user so that an additional action corresponding to the system message is output to the user when the measured elapsed time exceeds the wait time,
wherein the processing circuitry is configured to determine whether or not to subtract the elapsed time, based on the system message and the user utterance, when the user utterance not corresponding to the answer to the system message is acquired after the system message is output.

2. The interaction apparatus according to claim 1,
wherein the processing circuitry is configured to:
determine not to subtract the elapsed time when the user utterance is a filler and the system message meets a predetermined condition; and
determine to subtract the elapsed time when the user utterance is a filler and the system message does not meet the predetermined condition.

3. The interaction apparatus according to claim 2,
wherein the predetermined condition includes a condition that the system message corresponds to a system message in a game in which words along a predetermined theme are alternately answered between the user and a system.

4. The interaction apparatus according to claim 2,
wherein the processing circuitry is configured to determine whether or not the user utterance is the filler by using a detection model that is machine-learned to input a speech recognition result of the user utterance and to output an estimation result of whether or not the user utterance is the filler.

5. The interaction apparatus according to claim 2,
wherein the processing circuitry is configured to determine whether or not the user utterance is the filler based on a profile information on an attribute of the user.

6. The interaction apparatus according to claim 1,
wherein the processing circuitry is configured to determine whether or not to subtract the elapsed time by using a subtractive decision model that is machine-learned to input an information based on the system message and a speech recognition result of the user utterance and to output an information indicating whether or not to subtract the elapsed time.

7. The interaction apparatus according to claim 6,
wherein the subtractive decision model is machine-learned to further input a profile information on an attribute of the user and output the information indicating whether or not to subtract the elapsed time.

8. The interaction apparatus according to claim 1,
wherein the processing circuitry is configured to set the wait time by using a decision model that is machine-learned to input an information based on the system message and output the wait time corresponding to the system message.

9. The interaction apparatus according to claim 8,
wherein the decision model is machine-learned to further input a profile information on an attribute of the user and output the wait time.

10. The interaction apparatus according to claim 9,
wherein the processing circuitry includes a classification model that is machine-learned to input the information based on the system message and output a classification information indicating whether or not the system message is a message which requests the user to answer, and
wherein the processing circuitry is configured to:
acquire the classification information by inputting the information based on the system message into the classification model; and
acquire and set the wait time by inputting the information based on the system message into the decision model when the acquired classification information indicates that the system message is the message which requests the user to answer.

11. A method, performed by processing circuitry of an interaction apparatus, comprising:
acquiring a system message for a user;
setting a wait time for receiving an answer from the user based on the system message;
measuring an elapsed time after the system message is output to the user;
acquiring a user utterance uttered by the user; and
controlling an interaction with the user so that an additional action corresponding to the system message is output to the user when the measured elapsed time exceeds the wait time,
wherein the method further includes determining whether or not to subtract the elapsed time, based on the system message and the user utterance, in response to the user utterance not corresponding to the answer to the system message is acquired after the system message is output.

* * * * *